United States Patent
Marupaduga et al.

(10) Patent No.: US 10,542,488 B1
(45) Date of Patent: Jan. 21, 2020

(54) METHOD AND SYSTEM FOR CONTROLLING POWER CONSUMPTION AT A BASE STATION THROUGH DYNAMIC CONFIGURATION OF ANTENNA STRUCTURES

(71) Applicant: Sprint Spectrum L.P., Overland Park, KS (US)

(72) Inventors: Sreekar Marupaduga, Overland Park, KS (US); Tom E. Patton, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/117,473

(22) Filed: Aug. 30, 2018

(51) Int. Cl.
| | |
|---|---|
| *H04B 7/185* | (2006.01) |
| *H04W 52/02* | (2009.01) |
| *H04W 52/52* | (2009.01) |
| *H04B 7/0452* | (2017.01) |

(52) U.S. Cl.
CPC ...... *H04W 52/0206* (2013.01); *H04B 7/0452* (2013.01); *H04W 52/52* (2013.01)

(58) Field of Classification Search
CPC ............... H04W 4/50; H04W 52/0274; H04W 72/0486; H04W 88/08
USPC .......................................... 455/13.3, 69, 522
See application file for complete search history.

(56) References Cited

U.S. PATENT DOCUMENTS

| | | | |
|---|---|---|---|
| 2010/0284449 | A1 | 11/2010 | de Veciana et al. |
| 2012/0165063 | A1* | 6/2012 | Scalia ............... H04W 52/343 455/522 |
| 2016/0277076 | A1 | 9/2016 | Stadelmeier et al. |
| 2016/0337017 | A1* | 11/2016 | Moon ................ H04B 7/0617 |
| 2016/0365906 | A1 | 12/2016 | Kusunoki |
| 2018/0184374 | A1 | 6/2018 | Yang et al. |
| 2018/0219711 | A1 | 8/2018 | Laporte et al. |

OTHER PUBLICATIONS

M M Aftab Hossain, et al., "Energy Efficiency of Massive MIMO: Coping with Daily Load Variation," Dec. 7, 2015.

* cited by examiner

*Primary Examiner* — Tu X Nguyen

(57) ABSTRACT

A mechanism to control power consumption by a base station, such as a base station that implements an antenna array, such as a massive-MIMO antenna array. A computing system detects operation by the base station in a low-usage state and operation by a collated base station in a low-usage state. In response, the computing system then causes reconfiguration of a proper subset of antenna structures of the antenna array from an enabled state to a disabled state, while keeping a remainder of the antenna structures of the antenna array in the enabled state.

19 Claims, 5 Drawing Sheets

METHOD AND SYSTEM FOR CONTROLLING POWER CONSUMPTION AT A BASE STATION THROUGH DYNAMIC CONFIGURATION OF ANTENNA STRUCTURES

BACKGROUND

A cellular wireless network typically includes a number of base stations that are configured to provide wireless coverage areas, such as cells and cell sectors, in which user equipment devices (UEs) such as cell phones, tablet computers, tracking devices, embedded wireless modules, and other wirelessly equipped communication devices (whether or not user operated), can operate. In turn, each base station could be coupled with network infrastructure that provides connectivity with one or more transport networks, such as the public switched telephone network (PSTN) and/or the Internet for instance. With this arrangement, a UE within coverage of the network could engage in air interface communication with a base station and could thereby communicate via the base station with various remote network entities or with other UEs served by the base station.

Such a network could operate in accordance with a particular radio access technology, with air-interface communications from the base stations to UEs defining a downlink or forward link and air-interface communications from the UEs to the base stations defining an uplink or reverse link.

In accordance with the radio access technology, each coverage area could operate on a carrier, which could be frequency division duplex (FDD), defining separate frequency channels for downlink and uplink communication, or time division duplex (TDD), with a single frequency channel multiplexed over time between downlink and uplink use. Further, on the downlink and uplink, the carrier could be structured to define various physical channels for carrying information between the base stations and UEs. For example, the air interface could be divided over time into frames, with each frame being divided in turn into subframes and timeslots, and the carrier bandwidth could be divided over frequency into subcarriers, which could be grouped within each timeslot to define physical resource blocks (PRBs) in which the subcarriers can be modulated to carry data.

Over the years, the industry has embraced various "generations" of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive-MIMO, beamforming, and/or other features, to support higher data rates and countless applications, such as mission-critical services, enhanced mobile broadband, and massive Internet of Things (IoT).

OVERVIEW

Under these or other radio access technologies, MIMO technology can enable a base station to engage in air interface communication concurrently on multiple different radio-frequency (RF) propagation paths, or MIMO "layers," with multiple layers possibly occupying the same air interface resources (e.g., PRBs) as each other. To facilitate this, the base station could be equipped with a MIMO antenna array, comprising multiple transmit antennas and multiple receive antennas. By suitably weighting and precoding transmissions by particular antennas in the array, the base station can then output separate but concurrent transmissions for receipt by its served UEs.

MIMO service could be used in a "single-user MIMO" (SU-MIMO) configuration to increase the data rate of transmission to a single UE, by multiplexing communications to the UE onto multiple separate layers using the same air interface resources as each other. For instance, when a base station has data to transmit to a UE, the base station could time-division-multiplex the data into multiple data streams, the base station could modulate the data streams onto the same PRBs as each other, and the base station could output the modulated data streams onto separate antenna ports for concurrent transmission on separate respective propagation paths to the UE. In practice, the UE could have two or more antennas, and the UE could estimate the channel distortion at each of its antennas and use the estimates to separately compute and uncover each of the base station's transmit signals. In theory, SU-MIMO could thus increase the data rate of communication to a UE by a multiple equal to the number of propagation paths, without requiring additional air interface resources.

Further, MIMO can also be used in a "multi-user MIMO" (MU-MIMO) configuration to increase the data capacity of the air interface by allowing communications to multiple UEs to use the same air interface resources as each other. For instance, a base station can modulate data streams destined to each of multiple UEs on the same PRBs as each other and can transmit the modulated data streams on a separate respective propagation paths for receipt by the UEs. To facilitate this, the base station could pre-code transmissions on each propagation path using weighted coefficients based on channel estimates from the UEs, in a manner that enables each UE to remove cross-talk and receive its intended data. In theory, MU-MIMO could thus increase the data capacity of the air interface by allowing a base station to serve more UEs at a time without requiring additional air interface resources.

In dense urban markets and other areas, wireless service providers may face a need to provide an increased extent of MIMO service. In particular, in such areas, a provider may serve a great many UEs or may otherwise need to support high aggregate throughput, but the provider may have limited available spectrum, such as a limited number of PRBs per timeslot. To help overcome that limitation, the provider may equip its base stations with a massive-MIMO antenna array.

While a traditional MIMO antenna array may include on the order of 2 to 8 antennas, a massive-MIMO antenna array would include many more antennas, perhaps on the order of tens, hundreds, or even thousands of antennas. For instance, a representative massive-MIMO antenna array could include 128 antennas, of which 64 might be configured as transmit antennas and the other 64 might be configured as receive antennas. With this arrangement, if 4 transmit antennas are used per layer, the massive-MIMO antenna array might support on the order of 16 layers, to facilitate concurrent transmissions to up to 16 UEs (e.g., 8 UEs with 2 layers apiece, or 16 UEs with 1 layer apiece) or transmission to a single UE with up to 16 layers, among other possibilities.

One problem with implementing a massive-MIMO antenna array at a base station, however, is that it can consume a great amount of power, which can be costly.

In practice, for instance, a massive-MIMO array may include or interoperate with a plurality of amplifiers for amplifying radio frequency (RF) signals to be emitted by the massive-MIMO transmit antennas, and each amplifier may be configured to be powered by a respective power supply. A representative massive-MIMO array may have one such amplifier respectively for each of its transmit antennas, with each amplifier amplifying RF signals to be emitted by a single respective transmit antenna. Alternatively, the massive-MIMO array may be divided into multiple discrete groups of transmit antennas (such as columns of transmit antennas, or the like), and each group of transmit antennas may have a respective amplifier, with each amplifier amplifying RF signals to be emitted by various transmit antennas in a respective group.

With such an arrangement, each amplifier will draw power from its associated power supply in order to amplify RF signals. In particular, the base station may regularly or repeatedly transmit certain RF signals (e.g., reference signals and other broadcast messages) using most or all of its transmit antennas, and the base station may also strategically engage in UE-specific transmissions (e.g., control signaling and bearer traffic communication) using some or all of its transmit antennas. To facilitate these transmissions, most or all of the base station's associated amplifiers will draw power from their respective power supplies in order to amplify RF signals for transmission. Further, even if there are times when the base station is not actively transmitting RF signals, each of the base station's amplifiers may still operate in a standby mode where it is ready to amplify RF signals, and an amplifier in standby mode may also draw power from its associated power supply.

By way of example, with a representative massive-MIMO array having 64 transmit antennas, the total power consumption may be on the order of 1500 Watts. Yet this level of power consumption can be quite costly for a wireless service provider.

One way to help manage this power consumption and the associated cost is to dynamically power off and thus disable some of the base station's transmit antennas at times when the base station is in a low-usage state, such as when the base station tends to serve or is serving a threshold low quantity of UEs and may be able to provide that service with fewer antennas.

For instance, the base station or an associated control entity could track the base station's UE load per time of day and, based on that data, could develop a prediction of times of day when the base station's load will be threshold low. The base station or associated entity could then apply that prediction to determine that at a current or approaching time of day, the base station is likely to be threshold lightly loaded. Alternatively, the base station or associated entity could determine an actual current level of the base station's load.

Upon detecting (actually or by prediction) that the base station is in a low-usage state, the base station could then responsively power off a proper subset (less than all) of its transmit antennas, by powering-off each such transmit antenna's associated power amplifier, while leaving a remainder of the base station's transmit antennas (i.e., their associated power amplifiers) powered on.

With a massive-MIMO array, powering off a proper subset of the transmit antennas while leaving a remainder of the transmit antennas powered on results in a reduction in effective size of the massive-MIMO array. For instance, if the massive-MIMO array normally operates with 64 transmit antennas, when all 64 transmit antennas are enabled (i.e., their associated amplifiers powered on), the massive-MIMO array may be considered to have a first effective array size with 64 transmit antennas. Whereas, with a proper subset of those antennas disabled (i.e., their associated amplifiers powered off), the massive-MIMO array may be considered to have a second effective array size smaller than the first effective array size.

By way of example, 32 of the array's 64 transmit antennas could be disabled, thus resulting in an effective array size having just 32 transmit antennas. Alternatively, 48 of the array's 64 transmit antennas could be disabled, thus resulting in a second effective array size having just 16 transmit antennas. And still alternatively, 56 of the array's 64 transmit antennas could be disabled, thus resulting in a second effective array size having just 8 transmit antennas. Other examples are possible as well.

Powering off some of the base station's transmit antennas in this manner can help reduce power consumption by the base station, as the powered-off amplifiers would then not be drawing power from their associated power supplies, or would be drawing at most very reduced power from their associated power supplies. Further, a benefit of disabling just a proper subset of a base station's transmit antennas while leaving the remainder of its transmit antennas enabled is that the base station can then continue to provide service using the remaining, enabled transmit antennas. For instance, the base station can continue to transmit broadcast messages and UE-specific communications as necessary.

Unfortunately, however, a technical problem that can arise by disabling a proper subset of a base station's antennas is that the base station may then be unable to adequately meet UE service demands.

One reason for this is that a reduction in the number of a base station's transmit antennas may correspondingly reduce the distance of wireless coverage provided by the base station, so that UEs located farther away from the base station may lose coverage of the base station.

Another reason is that, with fewer transmit antennas, the quantity of MIMO layers that the base station could provide may be correspondingly reduced, thus restricting the quantity of UEs that could be on available air interface resources (e.g., PRBs). Although this may not usually be an issue if the base station is operating in a low-usage state, there is always a chance that the base station could be faced with an unexpected demand for service and/or that a prediction of the base station's low-usage state may have been wrong. In that case, the base station with its reduced quantity of transmit antennas may be unable to immediately meet demands for service.

To help address this issue, the present disclosure provides that when a base station is deemed (e.g., predicted or actually determined) to be operating in a low-usage state, the base station will disable a proper subset of its transmit antennas only if a determination is also made that a collocated base station is also operating in a low-usage state, so that the collocated base station could handle possibly unexpected additional service demand.

This process could apply, for instance, in a multi-band system where two or more base stations are collocated with each other (e.g., sharing an antenna tower and cell site) but operate on different frequency bands than each other. For example, a first base station having a massive-MIMO array may be configured to provide service on a first frequency band and not on second and/or third frequency bands, and a second base station collocated with the first base station and having its own separate antenna (e.g., its own antenna array) may be configured to provide service on the second frequency band and perhaps on the third frequency band but not on the first frequency band.

In a specific implementation, a first base station with a massive-MIMO array may be configured to provide service on frequency band B41 (TDD, around 2500 MHz), and the second collocated base station may be configured to provide service on frequency bands B25 (FDD, around 1900 MHz) and B26 (around 850 MHz).

With such an arrangement, disabling a proper subset of the first base station's transmit antennas in response to detecting operation of the first base station in a low-usage state could be conditioned on further detecting operation of the second base station also operating in a low-usage state. For instance, the first base station or an associated entity could detect (actually or by prediction) operation of both the first base station and the second base station in a low-usage state. And in response to detecting operating of both of the base stations in the low-usage state, the first base station could disable a proper subset of its own transmit antennas. As a result, the first base station would have a reduced scope of coverage and reduced MIMO capability. However, the second base station with its low-usage state may then be able to absorb possibly unexpected additional service demand.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
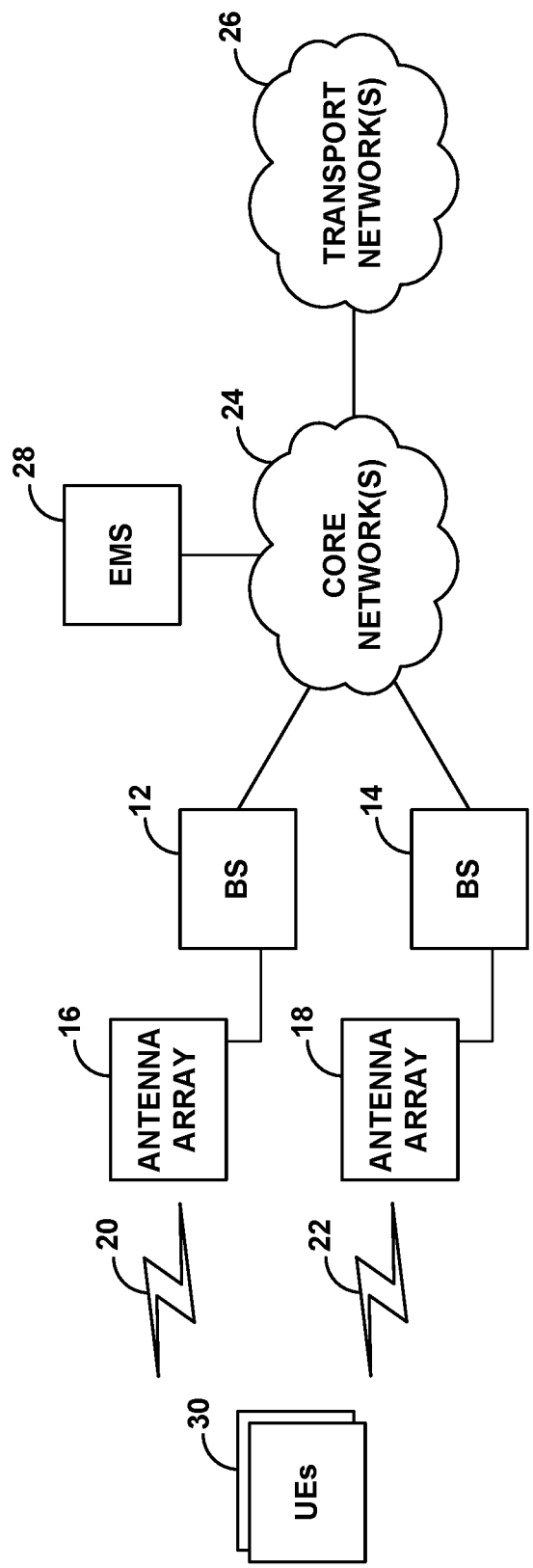
FIG. 1 is a simplified block diagram of a wireless communication system in which various disclosed features can be implemented.

Referring to the drawings, as noted above, FIG. 1 is a simplified block diagram of an example wireless communication system in which various disclosed features can be implemented. It should be understood, however, that numerous variations from this and other disclosed arrangements and operations are possible. For example, elements or operations could be added, removed, combined, distributed, or otherwise modified. In addition, operations described as being performed by one or more entities could be implemented in various ways, such as by a processor executing instructions stored in non-transitory data storage, along with associated circuitry or other hardware, for instance.

As shown in FIG. 1, the example wireless communication system includes two collocated base stations 12, 14, each having a respective antenna array 16, 18 through which to provide a respective coverage area 20, 22. Each base station could be a macro base station of the type configured to provide a wide range of coverage, with its antenna array mounted on a tower or other tall structure. Alternatively, either base station could take other forms, such as a small cell base station, a femtocell base station, or the like, configured to provide a smaller range of coverage.

The base stations and coverage areas are shown separately for simplicity. In practice, however, the base stations may be collocated with each other at a common cell site, such as by having their antenna arrays mounted on a common antenna tower and optimally pointing in the same direction as each other, and possibly sharing a baseband unit or other equipment.

Each base station could be configured to operate according to a 4G, 5G, or other radio access technology, and the base stations may operate on different radio access technologies than each other. Further, each base station is configured to provide service on one or more carriers in one or more frequency bands. For instance, base station 12 might be configured to provide service on one or more carriers in band B41, and base station 14 might be configured to provide service on one or more carriers in band B25 and/or B26.

Base stations 12, 14 are shown coupled with one or more core networks 24. For example, both base stations could be coupled with an enhanced packet core network including components supporting an applicable radio access technology. Each such core network may then provide connectivity with one or more transport networks 26, such as the Internet for instance. Further, shown sitting on a representative core network is an element management system (EMS) 28, which is an example of an entity that could centrally track and control operation of the base stations and other nodes. Shown within coverage of the base stations 12, 14 are then a plurality of representative UEs 30, which could take any of the forms discussed above by way of example.

In practice, when a UE enters into coverage of such a base station, the UE may detect and evaluate coverage of the base station (e.g., by detecting broadcast of a synchronization signal and measuring strength of a reference signal). The UE may then engage in signaling to establish a radio-link-layer connection with the base station and, if appropriate, to register for service with the network. Once connected and registered, the base station may then serve the UE, coordinating downlink and uplink air interface communications with the UE and enabling the UE to engage in communication on transport network(s) 26.

Each such base station may serve multiple UEs at once. In particular, numerous UEs may be connected with the base station at a time, and the base station may schedule air interface communications to and from the UEs, allocating PRBs and making use of available MIMO layers among the UEs as appropriate. In operation, each base station may thus provide a varying extent of service over time. For instance, the base station may serve a varying quantity of UEs over time and/or schedule a varying quantity of data communication (e.g., per unit time) over time.

Each base station may track the extent to which the base station provides service over time, such as how many UEs the base station serves in each hour or other time increment of each day. Further, each base station may report this data to the EMS 28 and to the other base station. And the each base station and the EMS may statistically roll up this data to establish statistical measures per base station of the extent to which the base station provides service on a per time of day basis or the like.

Such measures could then be used as a basis to predict that at a given time of day, a given base station is likely to provide a particular level of service. For instance, the measures could be used to predict that at a current time of day, a given base station is likely to be operating in a low-usage state where the base station provides a threshold low extent of service (e.g., that the base station is likely to be serving less than a predefined low number of UEs). Further, other bases may exist for making such predictions. For instance, scheduled events may establish whether or not a base station is likely to be operating in a low-usage state at a given time of day.

Figure 2:
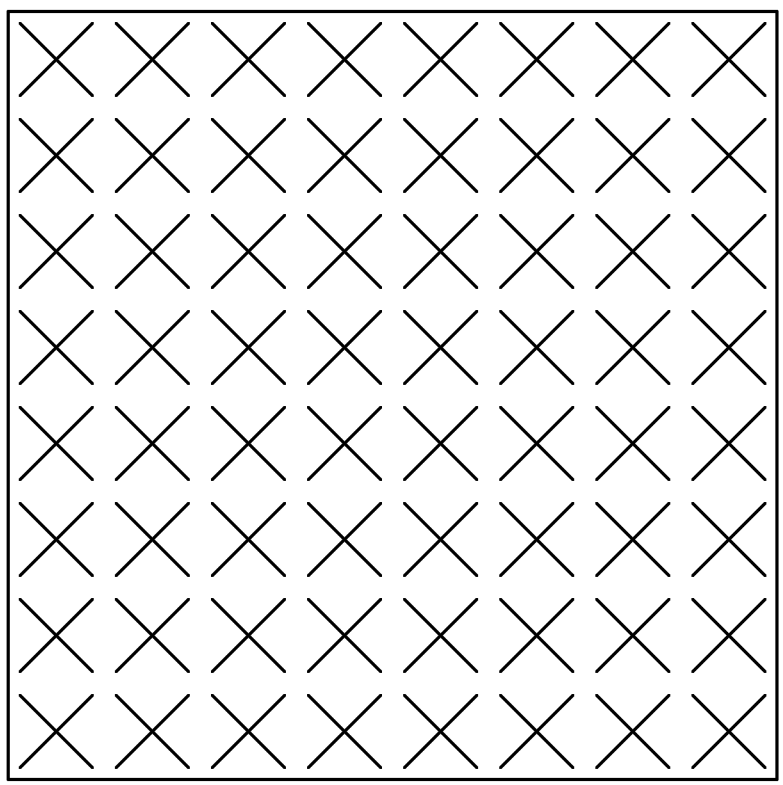
FIG. 2 is a simplified diagram of an example massive-MIMO antenna array that could be implemented according to the disclosure.

FIG. 2 is next a simplified diagram of a representative massive-MIMO array that may be implemented at base station 12 in an example implementation. In this illustration, each X represents two antennas (or antenna elements), one with positive polarization and one with negative polarization. As a result, each column in the example array includes eight antennas with positive polarization and eight antennas with negative polarization. As there are eight columns of antennas, the massive-MIMO array thus has a total of 128 antennas. In a representative implementation, 64 of these antennas could be configured as transmit (downlink) antennas, and the other 64 could be configured as receive (uplink) antennas. For instance, all of the antennas with positive polarization could be configured as transmit antennas, and all of the antennas with negative polarization could be configured as receive antennas.

As discussed above, with this massive-MIMO antenna array, the base station may be able to provide 16 layers of MIMO transmission. For instance, for each layer, the base station could use 4 of its transmit antennas to provide beamformed transmission defining a respective MIMO layer. Thus, the base station could in theory transmit with up to 16 layers on a common set of air interface resources (e.g., PRBs), perhaps with up to 16 UEs grouped for MU-MIMO service, or serving a single UE with 16 layers of SU-MIMO service, among other possibilities.

With this example massive-MIMO array, each transmit antenna may have its own respective amplifier for amplifying RF signals to be transmitted by the antenna. As a result, the massive-MIMO array may have a total of 64 such amplifiers. Alternatively, other arrangements may be possible. For instance, each column or another bank of transmit antennas may be grouped together and served by an amplifier (which might be configured to amplify RF signals separately destined to individual antennas or sub-groups of antennas within the column of antennas). Or other antenna/amplifier allocations could be defined, optimally including a plurality of amplifiers for the plurality of transmit antennas of the massive-MIMO array.

Further, as discussed above, each such amplifier may have an associated power supply that supplies power to the amplifier to enable the amplifier (i) to amplify RF signals and (ii) when in a standby mode, to be ready to amplify RF signals. And as noted above, in operation, the plurality of amplifiers may cooperatively draw substantial power from their power supplies.

Figure 3:
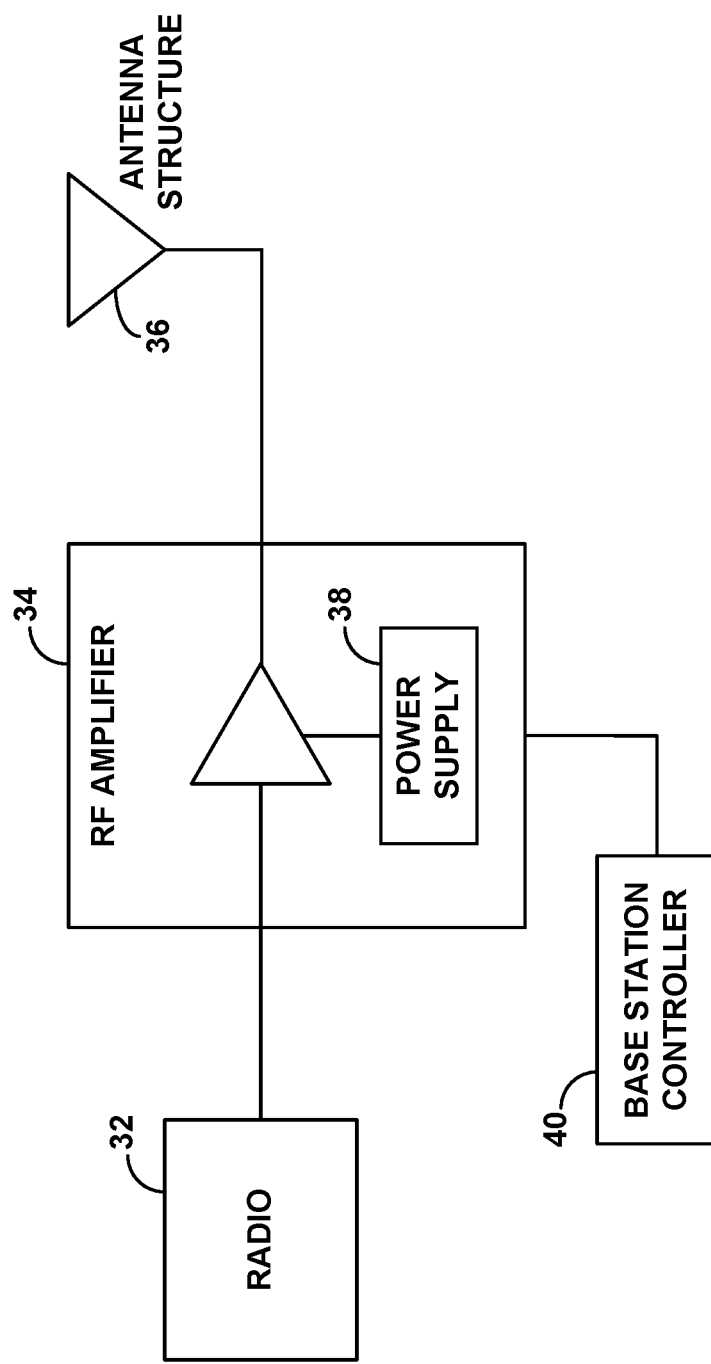
FIG. 3 is a simplified circuit diagram depicting an example RF chain for a respective antenna structure of the example antenna array.

FIG. 3 is a simplified circuit diagram depicting an example RF chain for a respective antenna structure, such as for a single antenna or a group of antennas, of the massive-MIMO array. As shown in FIG. 3, the RF chain includes a radio 32, an RF amplifier 34, and an antenna structure 36. Though not shown, the RF chain may include other components as well, such as a an RF filter, an RF switch, and the like.

Radio 32 could be situated in a baseband unit of the base station and operates to modulate signals onto an RF carrier for transmission by the antenna structure 36. The modulated RF carrier signal output by radio 32 then passes to RF amplifier 34, which operates to amplify the signal and output an amplified RF signal. And the antenna structure then operates to transmit the amplified RF signal over the air for receipt by one or more UEs.

As shown, the RF amplifier includes (or otherwise interoperates with) a power supply 38. The power supply could be connected with an alternating current power source and could supply power to drive the RF amplifier. The RF amplifier could consume power while amplifying RF signals provided by radio 32 for emission by antenna structure 36, and the RF amplifier could also consume power while in a standby mode, i.e., if not currently amplifying RF signals, but while ready to amplify RF signals.

As further shown, base station 12 could include a controller 40 in communication with RF amplifier 34. Controller 40 could be part of the base station's baseband unit and could operate to engage in control signaling with the RF amplifier to control the level of amplification provided by the amplifier and further to turn the amplifier on and off when desired. Powering off the amplifier could involve effectively opening a circuit between the amplifier and its power supply 38, so that the power supply does not supply power to the amplifier. Alternatively, powering off the amplifier could be accomplished in other ways.

Note that the RF amplifier could be configured as a matched load for downlink signaling from the radio while the RF amplifier is powered off, so as to dissipate downlink RF signals and help avoid RF reflections.

Figure 4:
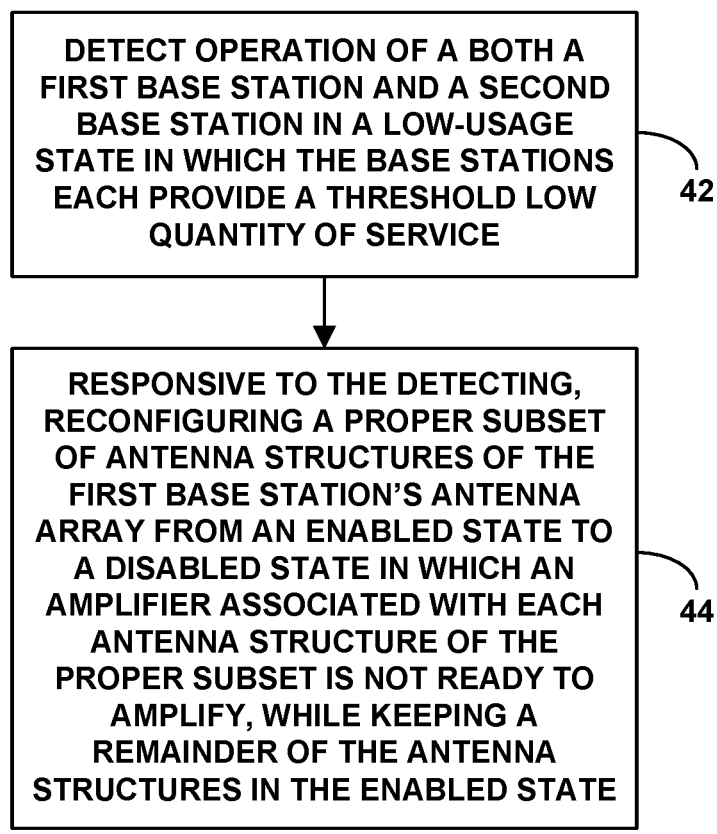
FIG. 4 is a flow chart depicting example operations in accordance with the disclosure.

FIG. 4 is next a flow chart depicting a method that can be carried out in accordance with the present disclosure to control power consumption by base station 12, where the base station 12 provides service using antenna array 16 comprising a first plurality of antenna structures, where each antenna structure has an associated amplifier 34 configured to be powered by an associated power supply 38, where base station 12 is collocated with base station 14, and base station 14 provides service using antenna array 18 also comprising a second plurality of antenna structures. The method could be carried out by a computing system, such as by base station 12 and/or EMS 28, among other possibilities.

As shown in FIG. 4, at block 42, the method includes the computing system detecting operation of both base stations 12, 14 in a low-usage state in which base station 12 and base station 14 each provide a threshold low quantity of service, with the detecting occurring when each of the antenna structures of the first plurality is in an enabled state in which the antenna structure's associated amplifier is at least ready to amplify (e.g., is powered on and ready to amplify and is perhaps currently amplifying).

As discussed above, the act of detecting operation of both base stations 12, 14 in the low-usage state could involve detecting occurrence of a time of day when, in past days, base station 12 and base station 14 have both been in the low-usage state. For instance, the computing system could make use of the measurements discussed above to predict that at a current time of day or at an approaching time of day, base station 12 and base station 14 will both be operating in the low-usage state.

Further, as discussed above, operation of either base station in the low-usage state could take various forms. For instance, operation of a base station in the low-usage state could involve the quantity of client devices (e.g., UEs) served by the base station being lower than a predetermined threshold (e.g., a specific count, or a percentage of maximum allowed quantity).

At block 44, the method then includes, responsive to the detecting, the computing system reconfiguring a proper subset of the first antenna structures from the enabled state to a disabled state in which the amplifier associated with each first antenna structure of the proper subset is not ready to amplify, while keeping a remainder of the first antenna structures in the enabled state.

The act of reconfiguring each such antenna structure of the proper subset from the enabled state to the disabled state could involve powering off the antenna structure's amplifier. For instance, this could involve the base station's controller transmitting to the antenna structure's amplifier a control signal to which the amplifier is configured to respond by transitioning from the enabled state to the disabled state, such as by turning off its power supply.

In practice, each first antenna structure's amplifier will draw less power from the amplifier's associated power supply when the first antenna structure is in the disabled state than when the first antenna structure is in the enabled state. For instance, each first antenna structure's amplifier may draw power from its associated power supply when it is in the enabled stated but may draw no power from its associated power supply when it is in the disabled state.

Further, as explained above, reconfiguring the proper subset of the first antenna structures from the enabled state to the disabled state can help to reduce overall power consumption by the first base station during the low-usage state, and keeping the remainder of the first antenna structures in the enabled state permits the first base station to continue providing service during the low-usage state.

Still further, note that this reconfiguration of the proper subset of antenna structures of base station 12 is responsive, at least in part, to the computing system detecting (e.g., determining or otherwise learning about) operation of base station 14 in the low-usage state. Thus, if the computing system has not detected operation of base station 14 in the low-usage state, then the computing system might not responsively reconfigure the proper subset of antenna structures of base station 12 even if the computing system has detected operation of base station 12 in the low-usage state. As explained above, this arrangement can help ensure that sufficient capacity exists to meet possibly unexpected service demand.

In a representative implementation, the computing system could be part of base station 12. In that case, the act of the computing system detecting operation of base station 14 in the low-usage state could be based on inter-base-station exchange of load information. For instance base stations 12, 14 could regularly exchange information regarding their respective levels of load. Thus, base station 12 could have information indicating (actually or by prediction) the extent to which base station 14 is providing service and could thereby determine whether base station 14 is operating in the low-usage state.

Alternatively or additionally, the computing system could be EMS 28, which could be configured to communicate over a core network 24 with base stations 12, 14. In that case, the act of the computing system reconfiguring the proper subset of the antenna structures of the first plurality from the enabled state to the disabled state could involve the transmitting from the element management system to base station 12 a directive to which the base station 12 is configured to respond by disabling the proper subset of the antenna structures of the first plurality.

In an implementation of this process, the massive-MIMO array of base station 12 normally has a first effective array size, and reconfiguring the proper subset of antenna structures from the enabled state to the disabled state and keeping the remainder of the first antenna structures in the enabled state cooperatively results in the massive-MIMO antenna array transforming from having the first effective array size to having a second effective array size smaller than the first effective array size. For instance, the first effective array size may have 64 transmit antennas, and the second effective array size may have fewer than 64 transmit antennas, perhaps just 32, 16, or 8 transmit antennas. This reduction could be done by disabling a select quantity of columns of transmit antennas in the massive-MIMO array, among other possibilities.

Accordingly, in a representative implementation, a method could involve detecting low-usage operational state in which the base station 12 provides a threshold low quantity of service when base station 14 also provides a threshold low quantity of service, where the detecting occurs while each antenna structure of a plurality included in the massive-MIMO antenna array of base station 12 is in an enabled state in which the antenna structure's associated amplifier, if and when presented with downlink signals, will amplify the downlink signals for transmission by the antenna structure.

Further, the method could involve, responsive to the detecting, reconfiguring a proper subset of the antenna structures of the plurality to each be in a disabled state in which the antenna structure's associated amplifier, if and when presented with downlink signals, will not amplify the downlink signals for transmission by the antenna structure, while keeping each remaining antenna structure of the plurality in the enabled state. As discussed above, the massive-MIMO array with each antenna structure of the proper subset being in the disabled state has a second effective array size smaller than the first effective array size, and reconfiguring the proper subset of the antenna structures to each be in the disabled state helps to reduce power consumption by base station 12.

Note also that this or other methods discussed herein could also involve dynamically increasing a base station's antenna array size in response to detecting operation of the base station in a threshold high-usage state or in response to detecting transition of the base station from operating in a low-usage state to no longer operating in a low-usage state. In this situation with a massive-MIMO array, for instance, the method could involve reconfiguring one or more antenna structures of the array from being in the disabled state to being in the enabled state. For example, if half of the massive-MIMO array's antenna structure had been disabled, those antenna structures could then be re-enabled. Other examples are possible as well.

Figure 5:
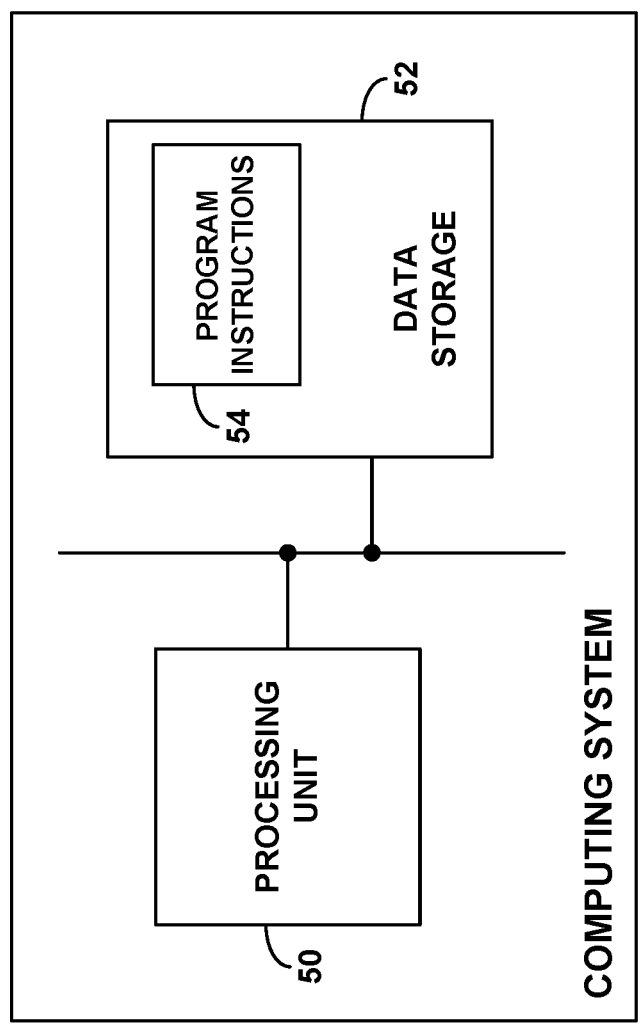
FIG. 5 is a simplified block diagram of a system operable in accordance with the disclosure.

Finally, FIG. 5 is a simplified block diagram of an example system for controlling power consumption by a first base station, where the first base station includes a plurality of antenna structures each having an associated amplifier powered by an associated power supply, and where the first base station is collocated with a second base station that has a separate respective set of one or more antenna structures. This system could be implemented at the first base station, at an EMS, and/or at one or more other entities.

As shown in FIG. 5, the example system includes a processing unit 50 (e.g., one or more general purpose processors and/or dedicated processors), non-transitory data storage 52 (e.g., one or more volatile and/or non-volatile storage components, such as magnetic, optical, or flash storage), and program instructions 54 stored in the non-transitory data storage 52 and executable by the processing unit 50 to carry out various operations described above.

Exemplary embodiments have been described above. Those skilled in the art will understand, however, that changes and modifications may be made to these embodiments without departing from the true scope and spirit of the invention.

We claim:

1. A method of controlling power consumption by a first base station, wherein the first base station provides service using a first antenna array comprising a plurality of first antenna structures, wherein each first antenna structure has an associated amplifier configured to be powered by an associated power supply, wherein the first base station is collocated with a second base station that provides service using a second antenna array comprising a plurality of second antenna structures, the method comprising:
  detecting by a computing system operation of both the first and second base stations in a low-usage state in which the first base station and second base station each provide a threshold low quantity of service, wherein the detecting occurs when each of the first antenna structures of the plurality of first antenna structures is in an enabled state in which the first antenna structure's associated amplifier is at least ready to amplify; and
  responsive to the detecting, reconfiguring by the computing system a proper subset of the first antenna structures from the enabled state to a disabled state in which the amplifier associated with each first antenna structure of the proper subset is not ready to amplify, while keeping a remainder of the first antenna structures in the enabled state, wherein each first antenna structure's amplifier draws less power from the amplifier's associated power supply when the first antenna structure is in the disabled state than when the first antenna structure is in the enabled state,
  wherein reconfiguring the proper subset of the first antenna structures from the enabled state to the disabled state helps reduce overall power consumption by the first base station during the low-usage state, and keeping the remainder of the first antenna structures in the enabled state permits the first base station to continue providing service during the low-usage state, and
  wherein the first base station is configured to provide service on a first frequency band and not on a second frequency band, and wherein the second base station is configured to provide service on the second frequency band and not on the first frequency band.

2. The method of claim 1, wherein the reconfiguring of the proper subset of the first antenna structures of the first antenna array used the first base station is responsive, at least in part, to detecting by the computing system operation of the second base station in the low-usage state.

3. The method of claim 1, wherein detecting the operation of both the first and second base stations in the low-usage state comprises detecting occurrence of a time of day when, in past days, the first base station and second base station have both been in the low-usage state.

4. The method of claim 1,
  wherein detecting operation of the first base station in the low-usage state comprises detecting that a quantity of client devices served by the first base station is lower than a predetermined threshold, and
  wherein detecting operation of the second base station in the low-usage state comprises detecting that a quantity of client devices served by the second base station is lower than the predetermined threshold.

5. The method of claim 1, wherein reconfiguring each first antenna structure of the proper subset from the enabled state to the disabled state comprises powering off the first antenna structure's amplifier.

6. The method of claim 1, wherein reconfiguring each first antenna structure of the proper subset comprises transmitting to the first antenna structure's amplifier a control signal to which the amplifier is configured to respond by transitioning from the enabled state to the disabled state.

7. The method of claim 1, wherein the computing system is part of the first base station, and wherein detecting by the computing system operation of the second base station in the low-usage state is based on inter-base-station exchange of load information.

8. The method of claim 1, wherein the computing system is an element management system having network communication with the first base station and with the second base station, wherein reconfiguring by the computing system the proper subset of the first antenna structures from the enabled state to the disabled state comprises transmitting from the element management system to the first base station a directive to which the first base station is configured to respond by disabling the proper subset of the first antenna structures.

9. The method of claim 1, wherein each first antenna structure's amplifier draws no power from the amplifier's associated power supply when the first antenna structure is in the disabled state.

10. The method of claim 1, wherein, for each first antenna structure in the disabled state, the first antenna structure's amplifier acts as a matched load to dissipate received downlink signals.

11. The method of claim 1, wherein each first antenna structure is selected from the group consisting of (i) a bank of antennas and (ii) a single antenna.

12. The method of claim 1, wherein the first antenna array is a massive multiple-input-multiple-output (massive-MIMO) antenna array having a first effective array size when all of the first antenna structures are in the enabled state, and
  wherein reconfiguring the proper subset of the first antenna structures from the enabled state to the disabled state and keeping the remainder of the first antenna structures in the enabled state cooperatively results in the massive-MIMO antenna array transforming from having the first effective array size to having a second effective array size smaller than the first effective array size.

13. The method of claim 12, wherein the first effective array size has 64 transmit antennas, and wherein the second effective array size has fewer than 64 transmit antennas.

14. The method of claim 12, wherein the second effective array size has a quantity of transmit antennas selected from the group consisting of 32, 16, and 8.

15. A method for controlling power consumption by a first base station, wherein the first base station includes a massive multiple-input-multiple-output (massive-MIMO) antenna array of a first effective array size, the massive-MIMO antenna array including a plurality of antenna structures each having an associated amplifier for amplifying downlink signals, wherein each antenna structure's associated amplifier is configured to be powered by an associated power supply, and wherein the first base station is collocated with a second base station that includes a separate respective antenna array, the method comprising:

detecting a low-usage operational state in which the first base station provides a threshold low quantity of service when the second base station also provides a threshold low quantity of service, wherein the detecting occurs while each antenna structure of the plurality is in an enabled state in which the antenna structure's associated amplifier, if and when presented with downlink signals, will amplify the downlink signals for transmission by the antenna structure; and responsive to the detecting, reconfiguring a proper subset of the antenna structures of the plurality to each be in a disabled state in which the antenna structure's associated amplifier, if and when presented with downlink signals, will not amplify the downlink signals for transmission by the antenna structure, while keeping each remaining antenna structure of the plurality in the enabled state, wherein the massive-MIMO array with each antenna structure of the proper subset being in the disabled state has a second effective array size smaller than the first effective array size, and wherein reconfiguring the proper subset of the antenna structures to each be in the disabled state helps to reduce power consumption by the base station, and wherein the first base station is configured to provide service on a first frequency band and not on a second frequency band, and wherein the second base station is configured to provide service on the second frequency band and not on the first frequency band.

16. The method of claim 15, wherein detecting the low-usage operational state comprises detecting present occurrence of a time of day when the low-usage operational state has occurred in past days.

17. The method of claim 15, wherein each antenna structure comprises a bank of antennas.

18. The method of claim 14, wherein the first array size has 64 transmit antennas, and wherein the second array size has fewer than 64 transmit antennas.

19. A system for controlling power consumption by a first base station, wherein the first base station includes a plurality of antenna structures each having an associated amplifier powered by an associated power supply, and wherein the first base station is collocated with a second base station that has a separate respective set of one or more antenna structures, the system comprising:

a processing unit;
    non-transitory data storage;
    program instructions stored in the non-transitory data storage and executable by the processing unit to carry out operations including:

detecting operation of both the first and second base stations in a low-usage state in which the first base station and second base station each provide a threshold low quantity of service, wherein the detecting occurs when each of the antenna structures of the antenna array of the first base station is in an enabled state in which the antenna structure's associated amplifier is at least ready to amplify, and wherein the detecting is base, at least in part, on the second base station being in the low-usage state; and responsive to the detecting, reconfiguring by the computing system a proper subset of the antenna structures from the enabled state to a disabled state in which the amplifier associated with each antenna structure of the proper subset is not ready to amplify, while keeping a remainder of the antenna structures in the enabled state, wherein each antenna structure's amplifier draws less power from the amplifier's associated power supply when the antenna structure is in the disabled state than when the antenna structure is in the enabled state, wherein reconfiguring the proper subset of the antenna structures from the enabled state to the disabled state helps reduce overall power consumption by the first base station during the low-usage state, and keeping the remainder of the antenna structures in the enabled state permits the first base station to continue providing service during the low-usage state, and wherein the first base station is configured to provide service on a first frequency band and not on a second frequency band, and wherein the second base station is configured to provide service on the second frequency band and not on the first frequency band.

* * * * *